(12) United States Patent
Gresley

(10) Patent No.: US 7,661,883 B2
(45) Date of Patent: Feb. 16, 2010

(54) SEALING ELEMENT FOR A ROTATABLE PART WITH A TRACTRIX FORM

(75) Inventor: Ross A. Gresley, Tega Cay, SC (US)

(73) Assignee: Schaeffler KG, Herzogenaurach (DE)

( * ) Notice: Subject to any disclaimer, the term of this patent is extended or adjusted under 35 U.S.C. 154(b) by 413 days.

(21) Appl. No.: 11/672,094

(22) Filed: Feb. 7, 2007

(65) Prior Publication Data

US 2007/0183702 A1 Aug. 9, 2007

Related U.S. Application Data

(60) Provisional application No. 60/771,166, filed on Feb. 7, 2006.

(51) Int. Cl.
*F16C 33/72* (2006.01)
*F16C 19/46* (2006.01)

(52) U.S. Cl. .............. 384/130; 384/127; 384/477; 384/485; 277/625; 277/590

(58) Field of Classification Search ............... 384/119, 384/130, 397, 473, 477, 546, 551, 565, 569, 384/586, 607, 127, 456, 548, 597; 277/455, 277/549, 345, 590, 625; 264/131, 161
See application file for complete search history.

(56) References Cited

U.S. PATENT DOCUMENTS

| | | | | | |
|---|---|---|---|---|---|
| 2,747,949 | A | * | 5/1956 | Smith | 384/484 |
| 3,493,645 | A | * | 2/1970 | Schmuckal | 277/575 |
| 3,957,278 | A | * | 5/1976 | Rabe | 277/549 |
| 4,664,643 | A | * | 5/1987 | Cusati | 464/131 |
| 4,878,652 | A | | 11/1989 | Wordin | |
| 5,044,606 | A | | 9/1991 | Wordin | |
| 5,419,641 | A | * | 5/1995 | Fujinami et al. | 384/470 |
| 5,695,199 | A | * | 12/1997 | Rao et al. | 277/455 |
| 6,086,255 | A | * | 7/2000 | Lyon | 384/12 |
| 6,109,659 | A | * | 8/2000 | Heidenreich et al. | 285/13 |
| 6,186,668 | B1 | * | 2/2001 | Beaman | 384/486 |
| 6,478,470 | B1 | * | 11/2002 | Bode | 384/569 |
| 6,484,999 | B1 | | 11/2002 | Wordin et al. | |
| 6,545,378 | B2 | * | 4/2003 | Chen et al. | 310/67 R |
| 6,583,952 | B1 | * | 6/2003 | Grantz et al. | 384/397 |
| 6,651,957 | B2 | | 11/2003 | Wordin et al. | |
| 6,979,131 | B1 | * | 12/2005 | Lippert et al. | 384/551 |
| 2003/0133633 | A1 | * | 7/2003 | Nakamura | 384/107 |
| 2005/0163409 | A1 | * | 7/2005 | Smith et al. | 384/494 |

FOREIGN PATENT DOCUMENTS

| | | | |
|---|---|---|---|
| DE | 19941361 | | 3/2000 |
| EP | 597438 A1 | * | 5/1994 |
| EP | 672849 A1 | * | 9/1995 |
| EP | 1369535 A1 | * | 12/2003 |
| JP | 2000291669 A | * | 10/2000 |
| JP | 2004190812 A | * | 7/2004 |
| JP | 2004332856 A | * | 11/2004 |

* cited by examiner

*Primary Examiner*—Marcus Charles
(74) *Attorney, Agent, or Firm*—Volpe and Koenig, P.C.

(57) ABSTRACT

A sealing element for rotatable parts is provided by the invention. To achieve low and uniform wear, automatic reshaping of the sealing surfaces for advancing wear, low friction forces, and long service life, the sealing element has sealing surfaces (4) and sealing counter surfaces (5), whose sealing effect is provided by the interaction of a sealing element (3, 11) constructed as a tractrix body with a correspondingly shaped sealing counter element (6, 13, 14).

11 Claims, 3 Drawing Sheets

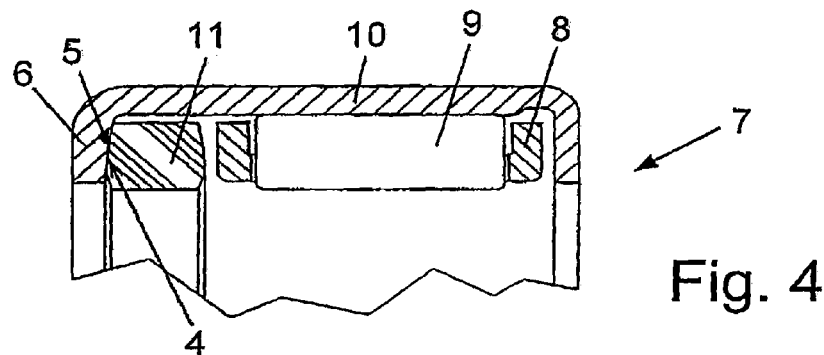
Fig. 4
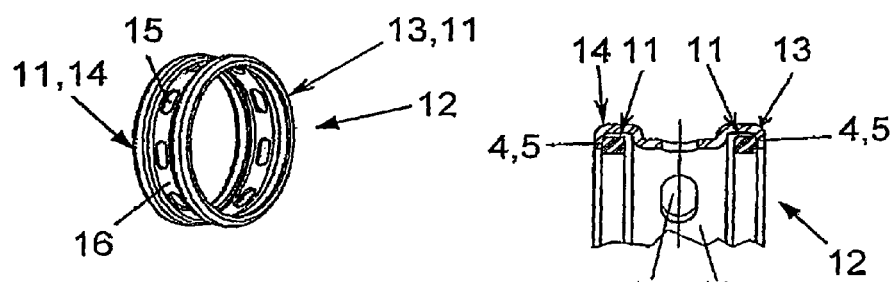
Fig. 5
Fig. 6
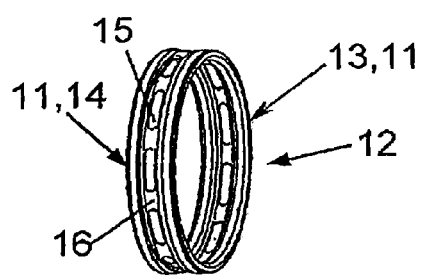
Fig. 7
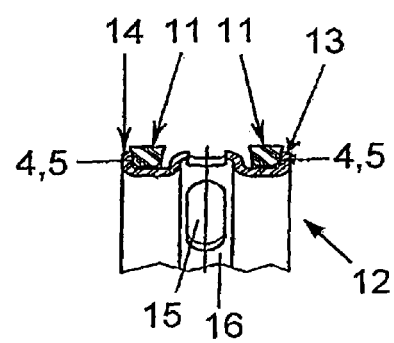
Fig. 8

(Prior Art)　(Prior Art)　(Prior Art)

SEALING ELEMENT FOR A ROTATABLE PART WITH A TRACTRIX FORM

CROSS REFERENCE TO RELATED APPLICATIONS

This application claims the benefit of U.S. Provisional Appln. 60/771,166, filed Feb. 7, 2006, which is incorporated by reference herein as if fully set forth.

BACKGROUND

The invention relates to a sealing element for parts mounted so that they can rotate counter to each other, wherein at least two corresponding sealing surfaces have a tractrix shape. In addition, the invention relates to seals for roller bearings and pressure-resistant sleeves for the inflow or outflow of fluids in shaft bores.

Seals for rotatably mounted parts are known with a plurality of different work principles and geometric embodiments. For example, gland seals are based on the fact that a soft material opposite the rotating part is pressed against the rotating part by a corresponding device with a defined force. Here, due to the contact of the rotating part on the stationary gland seal, friction is produced, which leads to a torque, for example, on the shaft, wear on the gland seal and the shaft, and thus also to abraded parts.

For so-called self-sealing packing rings, in particular radial sealing rings, the sealing effect against a rotating shaft is also based on one or more sealing lips, which are in contact with the rotating shaft. Here, a spring integrated in the sealing lip is often provided for the necessary dimensional accuracy and contact force. Accordingly, in the design of the seal, a compromise must be accepted between the contact force of the sealing element and the size of the resulting, friction-dependent braking moment, as well as the generated wear. Not least of all, for the given sealing effect, a compromise must be accepted between a harder sealing material with longer service life, but usually higher required contact pressure and greater wear on the shaft, as well as a softer sealing material with usually lower contact pressure but often shorter service life.

For better understanding, it is noted both here and below, that the arrangements do not depend on the allocation of the seal to a rotating part, like a shaft, or a stationary part, like a housing or an axle. The decisive factor is merely the relative rotational movement of a part with a sealing function relative to another part.

Here, a rotating part is understood to refer not explicitly to only a pivotable part that in normal operation is rotated by only a fraction of a complete revolution. Also, e.g., the spindle of a valve, which can rotate between its end positions typically by a few up to a maximum of a few dozen revolutions, is applicable in this sense not as a rotating part but instead as a merely pivoting part. The loading in this case and the stated requirements are different and for the most part considerably smaller than in the case of a seal for rotating parts.

A rotating part distinguishes itself in the sense of this publication in that, in principle, it can execute a nearly unlimited number of revolutions relative to a stationary part and also executes a considerable number of revolutions relative to the stationary part for typical, function-specific use.

Thus, the servo axle of a modular-construction servo is only a pivoting part, while the shaft of a stepper motor of a printer-head drive is to be considered as a rotating part due to the plurality of revolutions from one end of the printing path to the other and the continuous motion during the operation of the printer. Roller-bearing seals are to be considered as rotating parts in principle and independent of their actual installation location and purpose of use, because according to their typical, function-specific use, they are designed for a very high number of revolutions.

For simplification, it is further defined that a sealing element or a sealing surface is a pivotable part or surface, which can be locked in rotation, for example, on a shaft, while a sealing counter element or a sealing counter surface is for the most part an essentially stationary element or an essentially stationary surface, which interacts with the sealing element, so that a sealing effect is achieved even for a relative rotation between these parts.

To reduce wear of the sealing surface and the sealing counter surface, the material of the seal is adapted to the material of the sealing counter surface and the appropriate conditions of use. It is further known to construct the shape, for example, of a sealing element, so that, e.g., a tight and reliable seat is guaranteed on a shaft and the seal still works satisfactorily for a long time even with the appearance of wear.

However, according to the prior state of the art, only characteristics of the sealing surface or sealing counter surface that offer advantages in terms of certain conditions of use relative to other seals are known. The common characteristic for them is that their sealing effect for the most part decreases rapidly for advancing wear of the sealing surfaces and/or the sealing counter surfaces.

It is further known that the tractrix curve, also called a hauling curve, drawing curve, pulling curve, or towing curve, is a transcendent curve, which is produced, for example, when a load, e.g., a watch, is pulled on a chain over a plane. In the case of primary interest here, the "actual" or straight tractrix curve, also called Huygens Tractrix after Christian Huygens, who first solved the underlying problem in 1693, the end of the watch away from the watch is pulled parallel along a straight line, e.g., the table edge. Here, the watch chain, in general the distance between the contact point and the coordinate axis, is constant in terms of its length.

If $A_0$ is the starting point of the "drawing part" and $P_0$ is the starting point of the "drawn part" and d is the distance $A_0 P_0 > 0$ (corresponds to the length of the watch chain), and the point A of the drawing part travels on a straight line at the table edge, and also the point P "follows" the drawn watch at a constant distance A, then P traverses a Huygens tractrix.

The function equation of the Huygens tractrix reads in Cartesian coordinates:

$$X = A[\cosh^{-1}(A/Y)] - \sqrt{(A^2 - Y^2)}$$

or $$y(x) = \pm d \cdot ar\cosh\frac{d}{x} \pm \sqrt{(d^2 - x^2)}$$

Because arcosh z can be expanded by ln z, this equation can also be written as $$y(x) = \pm d \cdot \ln\left|\frac{d + \sqrt{(d^2 - x^2)}}{x}\right| \pm \sqrt{(d^2 - x^2)}$$

In general, that is, in particular for cases, in which the guide curve (the path of the point A, in the previous example along a straight table edge) is not a straight line coinciding with a coordinate axis, but instead is any curve lying in the plane, the tractrix or hauling curve can be expressed as follows:

Let there be given a parameter t, a (guide) curve k, an arbitrary (starting) point $A_0$, which lies on the curve k, and an arbitrary point $P_0$. Here, let D be the distance between the points $A_0$ and $P_0$. Now if point A(t) traverses along the curve k with $A(0)=A_0$ with increasing t, then it "follows" the point P(t) with $P(0)=P_0$ at a constant distance d. The set of all points that P(t) traverses is designated as the tractrix of curve k:

$$A(t) = P(t) + d \cdot \frac{\dot{P}(t)}{|\dot{P}(t)|}$$

with $\dot{P}(t) \neq 0$.

Now if a tractrix, in particular a Huygens tractrix, is rotated about its Y-axis, then one obtains a pseudosphere with an equitangential boundary line, which is called a tractrix surface below. Rotation of only one section of the Huygens tractrix delivers a corresponding body, which describes a frustum with curved outer line and which is designated as a tractrix body below.

A known property of the tractrix surface or the tractrix body is that the resulting loading is distributed uniformly as a force over the surface for an axial pressure. The forces always act perpendicular to the surface. Plastic material creep due to forces acting diagonal to the surface is thus ruled out.

A practical application of the tractrix surface or the tractrix body has become known from the shape of a plug for a tap. For example, U.S. Pat. Nos. U.S. Pat. No. 4,878,652 B1 and U.S. Pat. No. 6,484,999 B1 each disclose plugs in the form of tractrix bodies, which exhibit an especially uniform pressure loading of the plug and thus a uniform, as well as, therefore especially low wear and low operating forces. Publications U.S. Pat. No. 5,044,606 A and U.S. Pat. No. 6,651,957 B2 disclose similar taps, wherein, however, the operating spindles of the plug also have in their sealing area tractrix bodies, which provide, together with a correspondingly shaped counter body in the form of a tractrix sleeve, not only for low and uniform wear, but also such that, for advancing wear of the surfaces, the tractrix form is always reproduced and the good sealing and running properties of the spindle seal are thus maintained. Here there is no suggestion for using tractrix bodies for seals, which are moved only occasionally and in the normal case only over a maximum of a quarter revolution.

From DE 199 41 361 A1, a sealing unit is known, which has two sealing rings that are arranged at a distance from each other and within annular grooves of a holder, in order to form a seal between a cylindrical shaft and a housing bore. Here, in the area of the sealing rings the holder contacts either the shaft or the housing and is thus locked in rotation with the sealing rings. The holder is created, so that it contacts neither the shaft nor the housing in an area between the sealing rings and also has openings, through which a lubricant is led from a bore in the housing into the area of the shaft between the sealing rings and can be led from there through a radial bore of the shaft into an axial bore of the same. The sealing rings can have different shapes, such as O-rings, continuous rings, lip seals, and labyrinth seals.

SUMMARY OF THE INVENTION

The invention is based on the problem of creating a seal for parts that can rotate counter to each other, with this seal being distinguished by low and uniform wear, automatic reshaping of the sealing surfaces for advancing wear, low friction forces, and long service life.

The invention is based on the knowledge that a configuration of the sealing surface in the form of a tractrix surface leads to uniform loading of the sealing surface during operation, thus to a good sealing effect, low friction forces, and low wear, as well as also automatic reshaping of the tractrix surface for advancing wear.

Consequently, the stated objective is met by a sealing element for rotatable parts, in which the sealing effect involves the interaction of a sealing element constructed as a tractrix body with a correspondingly shaped sealing counter element.

Here, a correspondingly shaped sealing counter element is understood to be a body that corresponds for the most part exactly to the negative shape of the tractrix body in the area of the effective sealing surface. Here, obviously in the sealing surface and/or in the sealing counter surface there can be recesses or openings, such as bores.

The subordinate claims describe preferred improvements or constructions of the invention.

If the tractrix body involves a Huygens tractrix, a relatively easily calculated shape is given and an especially favorable construction of the seal is produced by the resulting normal distribution of the forces acting on the seal.

If the sealing element is arranged on a shaft and the correspondingly shaped sealing counter element is a component of a bearing, an especially low-wear, long-life, and smooth-running bearing seal is produced.

As long as the bearing involves a roller bearing, the integration into a usually already existing bearing shell can be especially simple. Such a bearing can replace a conventional, standard bearing without additional adaptation measures. However, even for hydrostatic and hydrodynamic bearings there are advantages in terms of an especially low required installation space and an especially high reliability of the seal, for the high pressures often predominating here.

If the correspondingly shaped sealing counter element is a part of a bearing ring, the seal can have an especially space-saving construction through this function integration.

Although it would be possible, in principle, to provide the sealing counter surface on the outside of a bearing ring and thus to seal the bearing from the outside, for most applications it is advantageous when the sealing element is arranged in the interior of the bearing and the correspondingly shaped sealing counter element is a part of a bearing ring, wherein the sealing counter surface, which is shaped corresponding to the tractrix-shaped sealing surface, is turned towards the bearing interior.

An especially beneficial improvement of the invention is provided in that an essentially hollow cylindrical or annular holding part is provided, on which at least two sealing elements spaced apart from each other axially are arranged so that they can rotate, wherein the sealing elements each have in the region of their radial outer axial ends a tractrix surface as a sealing surface, and the holding part contacts at least partially on the tractrix surface and is also embodied as a sealing counter surface.

In this way, an assembly is created, which can selectively seal from the outside or the inside a defined area of a shaft corresponding essentially to the axial width of the holding part between the sealing elements. If the sealing surfaces are arranged at the outer edges of the sealing elements, an arrangement is produced, which can reliably seal an area of high pressure between the sealing elements against the other area of the shaft.

According to one improvement, if the essentially hollow cylindrical or annular holding part has openings in the area between the sealing elements, and this area with openings has an outer diameter that is smaller than the largest outer diameter of the holding part, and further has an internal diameter, which is smaller than the outer diameter of the sealing element, in an especially simple way, an area of a shaft can be sealed axially relative to the remaining shaft and this area can be used for feeding fluid, especially lubricant or hydraulic fluid, into a bore of a shaft. Here, the holding part is set in a cylindrical recess of a housing in the form of a socket, while the sealing elements sit on a shaft.

An alternative variant of the improvement provides that the essentially hollow cylindrical or annular holding part has openings in an area between the sealing elements and the area with these openings has an outer diameter that is smaller than the outer diameter of the sealing element and an inner diameter that is larger than the smallest inner diameter of the holding part. This embodiment is provided such that the holding part is set on a shaft while the sealing elements contact a housing recess.

BRIEF DESCRIPTION OF THE DRAWINGS

The invention is explained in more detail below with reference to the attached drawing using a few embodiments. Shown are.

DETAILED DESCRIPTION OF THE DRAWINGS

Figure 1:
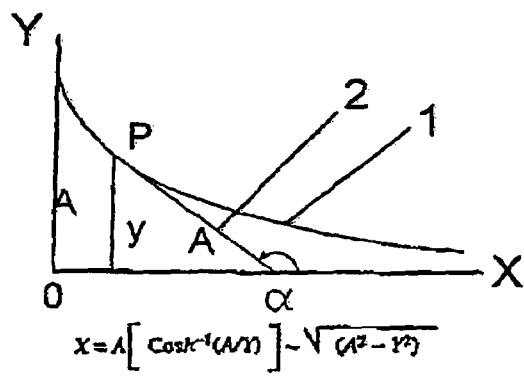
FIG. 1 a geometric representation of a tractrix curve.

FIG. 1 shows a geometric representation of a tractrix curve 1, stated more precisely, a Huygens tractrix curve. Here, point P corresponds to the instantaneous position of an imaginary object, for example, a watch, which is pulled on a plane represented by the plane of the drawing on an imaginary watch chain 2 of constant length A, wherein the imaginary pull on the watch chain is performed along the X-axis. The distance y of the imaginary watch or the point P becomes consistently smaller but with decreasing rate from the X-axis or the table edge.

Figure 2:
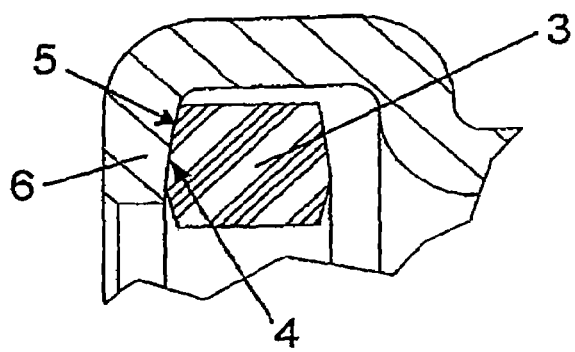
FIG. 2 a seal according to the invention.

FIG. 2 shows a seal according to the invention, wherein the sealing element 3 here has the shape of a sealing ring and can be mounted on a not-shown shaft. The sealing element 3 is constructed in the area of its sealing surface 4 as a tractrix body or the sealing surface 4 is constructed as a tractrix surface. This interacts with a correspondingly shaped sealing counter surface 5 of a sealing counter element 6.

Figure 3:
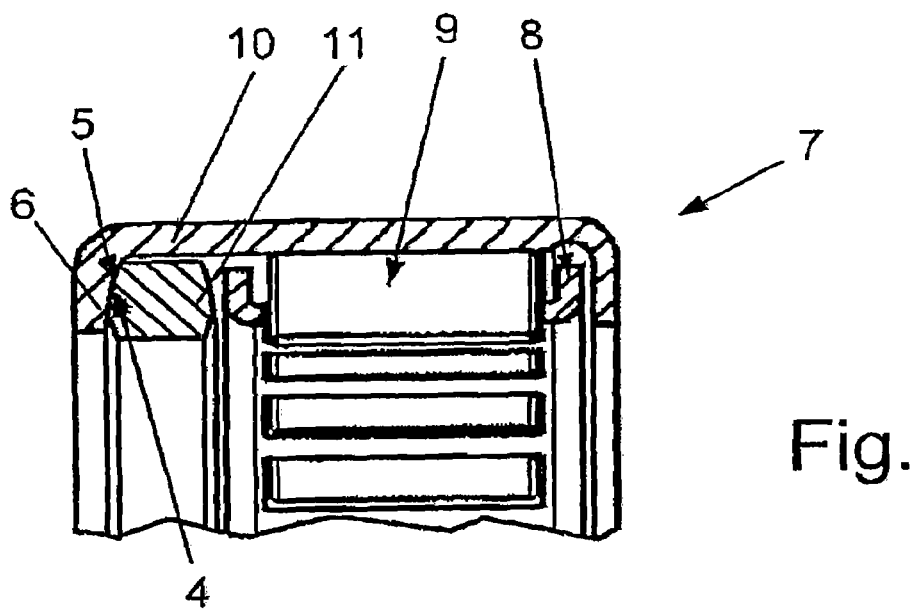
FIG. 3 a seal according to the invention as an integral component of a roller bearing, FIG. 4 another seal according to the invention as an integral component of a roller bearing, FIG. 5 a perspective view of a sealing element for introducing a fluid into a shaft, FIG. 6 a section view of the sealing element according to FIG. 5, FIG. 7 a perspective view of another sealing element for introducing a fluid into a shaft, FIG. 8 a section view of the sealing element according to FIG. 7.
Figure 9:
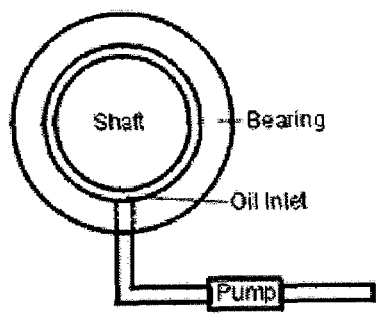
FIG. 9 is a view of a prior art hydrostatic bearing.
Figures 10A, 10B, 10C:
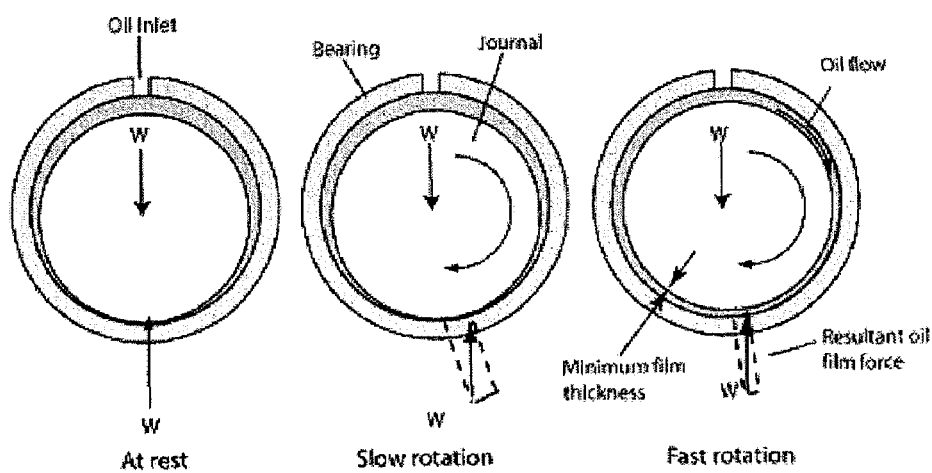
FIGS. 10A-10C are views of a prior art hydrodynamic bearing showing the increase in film thickness as the rotation speed of the journal increases.

FIG. 3 shows the possibility of integrating a seal according to the invention into a bearing 7 constructed as a roller bearing, wherein the roller bearing 7 has a cage 8 that holds the roller bodies 9 constructed here as cylinder rollers in an outer bearing ring 10, which has the shape of a bearing shell. The roller bearing 7 further has on its left side shown in the representation a sealing element 11 arranged in the bearing ring 10 in the form of a bearing sealing ring. In the area of the sealing functional area 4, the bearing sealing ring 11 is constructed, in turn, as a tractrix body or the sealing surface 4 is constructed as a tractrix surface. This interacts with a correspondingly shaped sealing counter surface 5 of a sealing counter element 6, which in this case, however, is an integral component of the outer bearing ring 10. It can be seen that the cage 8 keeps sufficient axial distance to the bearing sealing ring 11.

FIG. 4 shows a roller bearing that is very similar to FIG. 3 with a bearing seal according to the invention. The same parts or function surfaces are provided with the same reference symbols.

The pressure-tight fluid guides shown in FIG. 5 and in FIG. 7 for a shaft each are formed from an annular holding part 12 that has radial, inner annular recesses in the area of its edges, which simultaneously form the sealing counter elements 13, 14. Sealing elements 11 constructed according to the invention are held within these recesses, wherein in the fluid guide shown in FIG. 5, the sealing elements 11 are arranged within the holding part 12, while the sealing elements 11 of the fluid guide shown in FIG. 7 are arranged radially on top on the holding part 12. Accordingly, the fluid guide according to FIG. 6 is provided for mounting in a housing, while the construction according to FIG. 7 is used for mounting on a shaft.

In the area between the sealing rings 11, the holding parts 12 have openings 15 in both cases. Here, the area 16 of the holding part 12 with the openings 15 is constructed so that it contacts neither the walls of the housing bore nor the shaft during operation. Thus, a fluid, for example, a hydraulic fluid or compressed air, can be led from a bore in the housing into a bore in the shaft (or vice versa), wherein the radial alignment of the bores is irrelevant.

FIGS. 6 and 8 each represent sections of the fluid guides shown in FIGS. 5 and 7, wherein the same parts are provided with the same reference symbols.

REFERENCE SYMBOLS

1 Tractrix curve
2 Watch chain
3 Sealing element
4 Sealing surface
5 Sealing counter surface
6 Sealing counter element
7 Bearing, roller bearing
8 Cage
9 Roller bearing
10 Bearing ring
11 Bearing seal, bearing seal ring
12 Holding part
13 Sealing element
14 Sealing element
15 Opening in holding part
16 Area of openings

The invention claimed is:

1. Sealing device for rotatable parts, comprising a sealing element constructed as a tractrix body and a correspondingly shaped sealing counter element which provide a sealing effect for relative rotating movement between a tractrix shaped sealing surface of the tractrix body and a correspondingly shaped sealing counter surface of the sealing counter element during rotation of the rotatable parts.

2. Sealing device according to claim 1, wherein the sealing element constructed as a tractrix body has the geometry of a Huygens tractrix in an area of the sealing surface.

3. Sealing device according to claim 1, wherein the sealing element is arranged on a shaft and the correspondingly shaped sealing counter element is a component of a bearing.

4. Sealing device according to claim 3, wherein the bearing comprises a roller bearing.

5. Sealing device according to claim 3, wherein the bearing comprises a hydrostatic bearing.

6. Sealing device according to claim 3, wherein the bearing comprises a hydrodynamic bearing.

7. Sealing device according to claim 3, wherein the correspondingly shaped sealing counter element is a part of a bearing ring.

8. Sealing device according to claim 7, wherein the sealing element is arranged in an interior of the bearing, and that the correspondingly shaped sealing counter element is a part of the bearing ring, and the sealing counter surface shaped corresponding to the tractrix-shaped sealing surface of the sealing element is turned towards an interior of the bearing.

9. Sealing device according to claim 1, wherein a generally cylindrical or annular holding part is provided, on which at least two of the sealing elements spaced apart from each other axially are arranged so that the sealing elements can rotate, wherein the sealing elements each have the tractrix surface as the sealing surface in a radial outer axial end area, and the holding part at least partially contacts the tractrix surface and comprises the sealing counter surface (5).

10. Sealing device according to claim 9, wherein the generally hollow cylindrical or annular holding part has openings in an area between the sealing elements and the area with the openings has an outer diameter that is smaller than a largest outer diameter of the holding part, as well as an inner diameter, which is smaller than an outer diameter of the sealing element.

11. Sealing device according to claim 9, wherein the generally hollow cylindrical or annular holding part has openings in an area between the sealing elements and the area with openings has an outer diameter that is smaller than an outer diameter of the sealing elements and has an inner diameter that is larger than a smallest inner diameter of the holding part.

* * * * *